(12) United States Patent
Kakehi

(10) Patent No.: US 7,133,439 B1
(45) Date of Patent: Nov. 7, 2006

(54) MOBILE COMMUNICATION TERMINAL AND METHOD OF COMMUNICATION

(75) Inventor: Yuji Kakehi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/936,294

(22) PCT Filed: Jan. 12, 2000

(86) PCT No.: PCT/JP00/00103

§ 371 (c)(1),
(2), (4) Date: Mar. 11, 2002

(87) PCT Pub. No.: WO01/52579

PCT Pub. Date: Jul. 19, 2001

(51) Int. Cl.
H04B 1/69 (2006.01)
H04B 1/713 (2006.01)

(52) U.S. Cl. .................. 375/150; 375/148; 375/149; 370/335; 370/320

(58) Field of Classification Search ............ 375/150, 375/147, 149, 256, 259, 316, 358, 148, 152, 375/226, 343, 344, 140, 143; 370/335, 328, 370/331; 455/422
See application file for complete search history.

(56) References Cited

U.S. PATENT DOCUMENTS

| 5,067,136 | A | * | 11/1991 | Arthur et al. | 375/142 |
| 5,793,796 | A | * | 8/1998 | Hulbert et al. | 375/150 |
| 5,910,948 | A | * | 6/1999 | Shou et al. | 370/335 |
| 5,991,332 | A | * | 11/1999 | Lomp et al. | 375/152 |
| 6,370,130 | B1 | | 4/2002 | Zhou et al. | |

FOREIGN PATENT DOCUMENTS

| EP | 0 442 341 A2 | 8/1991 |
| EP | 0884856 A | 12/1998 |
| EP | 0 905 923 A2 | 3/1999 |
| JP | 10094041 A | 4/1998 |
| JP | 10126380 A | 5/1998 |
| JP | 10127378 A | 5/1998 |
| JP | 10200505 A | 7/1998 |
| JP | 10327126 A | 12/1998 |
| JP | 11196460 A | 7/1999 |
| JP | 11275036 A | 10/1999 |

OTHER PUBLICATIONS

Kavehrad, Mohsen et al., "Direct Sequence Spread Spectrum with DPSK Modulation and Diversity for Indoor Wireless Communications", IEEE Trans. on Comm., Feb. 1987, vol. COM-35, No. 2, pp. 224-226.*

(Continued)

Primary Examiner—Mohammed Ghayour
Assistant Examiner—Qutub Ghulamali
(74) Attorney, Agent, or Firm—Rothwell, Figg, Ernst & Manbeck, PC

(57) ABSTRACT

A mobile communication terminal includes a receiver (2) receiving a radio wave from base stations, a detector (5, 6, 7) detecting spread codes from the signal received by the receiver (2), a demodulator (8) demodulating the received signal with the spread codes detected by the detector (5, 6, 7), a decoder (9) decoding data demodulated by the demodulator (8), and a control unit (4) controlling processing during cell search, and stopping processing of the data in response to reception of invalid data. Since the control unit (4) stops the processing of the data if it receives the invalid data, the cell search can be performed fast.

13 Claims, 9 Drawing Sheets

OTHER PUBLICATIONS

Hagon, P. J., "A Programmable Surface Acoustic Wave Matched Filter for Phase-Coded Spread Spectrum Waveforms", IEEE Transaction on Microwave Theory and Techniques, pp. 303-306, Apr. 1973.*

Saleh, Adel A.M. et al., "An Experimental TDMA Indoor Radio Communications System Slow Frequency Hopping and Coding", IEEE Trans. on Comm., Jan. 1991, 39(1):152-161.*

Kenichi Higuchi et al., Fast Cell Search Algorithm using Long Code Masking in DS-CDMA Asynchronous Cellular System, *Technical Report of Ieice*, 1997-2001, pp. 57-63.

Fumiyuki Adachi et al., Wideband DS-CDMA for Next-Generation Mobile Communications Systems, *IEEE Commun. Mag.*, Sep. 1998, pp. 56-69.

3GPP TS 25.211 V3.5.0, Physical channels and mapping of transport channels onto physical channels (FDD) (Release 1999), pp. 1-45.

3GPP TS 25.213 V3.4.0, Spreading and modulation (FDD) (Release 1999), pp. 1-26.

3GPP TS 25.214 V3.5.0, Physical layer procedures (FDD) (Release 1999), pp. 1-47.

* cited by examiner

MOBILE COMMUNICATION TERMINAL AND METHOD OF COMMUNICATION

TECHNICAL FIELD

The present invention relates to a mobile communication terminal employing a code division multiplex method for communication, and particularly a mobile communication terminal which rapidly searches adjacent cells during cell search.

BACKGROUND ART

In recent years, mobile communication terminals such as a portable telephone and a mobile telephone have been widely used, and various kinds of multiple access methods have been developed for use in such mobile communication systems. Among them, a CDMA (Code Division Multiple Access) method has been employed in portable telephones and others because it has high quality reception capability through the exploitation of multipath fading, and can achieve a high utilization efficiency of radio resource (can increase a subscriber capacity).

FIG. 8 is a schema which shows that the mobile station can receive a number of radio waves transmitted from adjacent cells via multiple propagation paths (multipath). In general, a plurality of base stations (BS1–BS5) are arranged regularly, and cells of the base stations form a regular polygon if these base stations are arranged to cover a service area with as high a electric field as possible, as is well known and shown in FIG. 8. When a mobile communication terminal (MS) performs the cell search, it receives a plurality of radio waves from respective base stations, and additionally receives radio waves (multipath), which are transmitted from various base stations, and are shifted in timing from each other due to wave reflection and diffraction. This multipath is not necessary, and therefore is deleted during the cell search operation by an appropriate manner.

A stepwise search method has been known as a fast cell search method. FIG. 9 shows a processing procedure for detecting and deleting multipath components in the stepwise search method. First, slot timing for those including multipath components is detected (short-period detection) (S101). Detection of slots is performed by detecting search codes of the slots. By detecting the frame timing code, the frame timing is detected (long-period detection), and further the code group is detected (S102).

In addition to the code group, the candidate codes which belong to the group is further evaluated (S103), and finally a spread codes is identified. Information such as spread codes, which is required for recognizing the multipath, is stored in a memory 110 (S104). In this manner, the multipath is recognized based on the information of code and timing stored in memory 110, and the multipath is deleted from the obtained information (S105). The information, from which the multipath is deleted as described above, is decoded so that an amount of decode processing is reduced, and fast cell search can be achieved.

However, the multipath is deleted after all the slot timing, frame timing and codes for one slot are detected and stored in memory 110. This results in a problem that the time required for the entire cell search cannot be reduced.

The invention has been developed for overcoming the above problem, and a first object of the invention is to provide a mobile communication terminal allowing fast cell search.

A second object of the invention is to provide a mobile communication terminal allowing accurate identification of spread codes.

A third object of the invention is to provide a communication method allowing fast cell search.

A fourth object of the invention is to provide a communication method allowing precise identification of spread codes.

DISCLOSURE OF THE INVENTION

According to an aspect of the invention, a mobile communication terminal includes a receiver receiving a radio wave from base stations; a detector detecting spread codes from signals received by the receiver; a demodulator demodulating the received signals with the spread codes detected by the detector; a decoder decoding data demodulated by the demodulator; and a control unit controlling cell search process, and stopping signal processing of the cell search in response to detection of invalid cell.

The control unit stops the signal processing of the cell search when invalid cell is received. Therefore, the cell search can be performed fast.

Preferably, the control unit determines the invalid cell based on the information received from the base station, and stops the processing of the cell.

Since the control unit stops the processing of the cell based on the information received from the base station, the cell search can be performed fast even in the cases, e.g., of erroneous detection of an unexisting code or frame timing.

The detector includes a slot timing detector detecting slot timing from the signals received by the receiver, a code group detector detecting a code group based on the slot timing detected by the slot timing detector from the signals received by the receiver, and a code detector detecting a code based on the slot timing detected by the slot timing detector and the code group detected by the code group detector from the signals received by the receiver.

The code group detector and the code detector detect the code group and the code based on the slot timing detected by the slot timing detector, respectively. Therefore, the identification of the spread codes of each slot can be accurately performed.

More preferably, the control portion stops the processing of received data when the code group detected by the code group detector is not a predetermined code.

Since the control unit stops the processing of received signals in the case where the code group detected by the code group detector is not the predetermined code, the cell search processing can be performed fast even in the case where an unexisting code group is erroneously detected.

More preferably, the code group detector includes a plurality of code generators generating a code corresponding to a different code group, a dummy code generator generating a dummy code different from the code group generated by the plurality of code generators, a plurality of correlators calculating correlations between the data received by the receiver and the codes generated by the plurality of code generators and a determining unit determining invalidity of the detected slot timing based on the calculation result of the plurality of correlators.

Since the correlators calculate the correlation between the received data and the code generated by the dummy code generator, it is possible to detect an inappropriate code group.

More preferably, the control unit stops the signal processing of the cell search if the code detector detects the code group other than the code group including the predetermined code.

Since the control unit stops the signal processing of the cell search if the code detector detects the code other than the predetermined code, the processing of cell search can be performed fast even if an unexisting code is erroneously detected.

More preferably, the code detector includes a plurality of code generators generating different codes, respectively, a dummy code generator generating a dummy code different from the codes generated by the plurality of code generators, a plurality of correlators calculating correlations between the data received by the receiver and the codes generated by the plurality of code generators, and a determining unit determining invalidity of the detected slot timing based on the calculation result of the plurality of correlators.

Since the correlators calculate the correlation between the received data and the code generated by the dummy code generator, an inappropriate code can be detected.

According to another aspect of the invention, a mobile communication terminal includes a receiver receiving a radio wave from base stations; a detector detecting spread codes from signals received by the receiver, a demodulator demodulating the received signals with the spread codes detected by the detector; a decoder decoding data demodulated by the demodulator; and a control unit dividing a slot into a plurality of search ranges, deleting multipath in the search range, successively allowing the demodulator to demodulate the received signals and allowing the decoder to decode the demodulated data.

The control unit divides the slot into a plurality of search ranges, deletes the multipath in the search range, and allows the decoder to decode successively the received data. Therefore, the data processing by the decoder can be reduced, and the cell search processing can be performed fast. Further, the detector, demodulator, decoder and control portion can be operated in parallel to perform pipeline processing so that the processing speed can be further increased.

Preferably, the control unit stops the decode processing if the decoded data in the search range is invalid data.

Since the control portion stops the decode processing if the decoded data in the search range is invalid data, the time required for the cell search can be further reduced.

According to further another aspect of the invention, a communication method includes the steps of receiving a radio wave from base stations; detecting spread codes from the received signals; demodulating the received signals with the detected spread codes; decoding the demodulated data; and controlling a cell search process, and stopping the signal processing of the cell search if the demodulated data is invalid.

If the demodulated data is invalid, the signal processing of the cell search is stopped so that the cell search can be performed fast.

Preferably, the step of stopping the signal processing of the cell search includes the step of determining invalid cell based on the information received from the base station, and stopping the signal processing of the cell search.

Since the signal processing of the cell search is stopped based on the information received from the base station, the cell search can be performed fast, for example, even in the case where an unexisting code is detected.

More preferably, the step of detecting the spread codes includes the steps of detecting slot timing from the received signals, detecting a code group based on the detected slot timing from the received signals, and detecting a code based on the detected slot timing and the detected code group.

Since the code group and the code are detected based on the detected slot timing, the spread codes of each slot can be accurately identified.

More preferably, the step of stopping the signal processing of the cell search includes the step of stopping the signal processing of the cell search if the code group received from the base station is not a code group including a predetermined code.

Since the signal processing of the cell search is stopped if the code group is not the code group including the predetermined code, the processing of cell search can be performed further fast if inappropriate data is received from the base station.

More preferably, the step of stopping the signal processing of the cell search includes the steps of generating codes corresponding to a plurality of different code groups, respectively, generating a dummy code different from the plurality of generated code groups, calculating the correlation of the received data with respect to the plurality of generated code and the dummy code, and determining invalidity of the detected code group based on a result of the calculation.

Since the correlation between the received data and the generated code is calculated, an inappropriate code group can be detected.

More preferably, the step of stopping the signal processing of the cell search includes the step of stopping the signal processing of the cell search if the code received from the base station is not a predetermined code.

If the code is different from the predetermined code, the signal processing of the cell search is stopped so that the cell search processing can be performed further fast even if an unexisting code group is erroneously detected.

More preferably, the step of stopping the signal processing of the cell search includes the steps of generating a plurality of different codes, generating a dummy code different from the generated code, calculating a correlation of the received data with respect to the plurality of generated codes and the dummy code, and determining invalidity of the data based on a result of the calculation.

Since the correlation between the received data and the generated code is calculated, an inappropriate code can be detected.

According to still another aspect of the invention, a communication method includes the steps of receiving a radio wave from base stations; detecting spread codes from the received signals; deleting multipath of the code already detected; successively demodulating the received signals subjected to the deletion of the multipath with the detected spread codes; and decoding the demodulated data.

The multipath of the code already detected is deleted, and the received data is successively demodulated and decoded. Therefore, the decode processing can be eliminated, and the processing of cell search can be performed fast.

Preferably, the decoding processing is not performed in the step of deleting the multipath if the newly detected code is the multipath.

Since the decode processing is not performed if the newly detected code is the multipath, the time required for the cell search can be further reduced.

BEST MODE FOR CARRYING OUT THE INVENTION

The invention will now be described in greater detail with reference to the drawings.

First Embodiment

Figure 1:
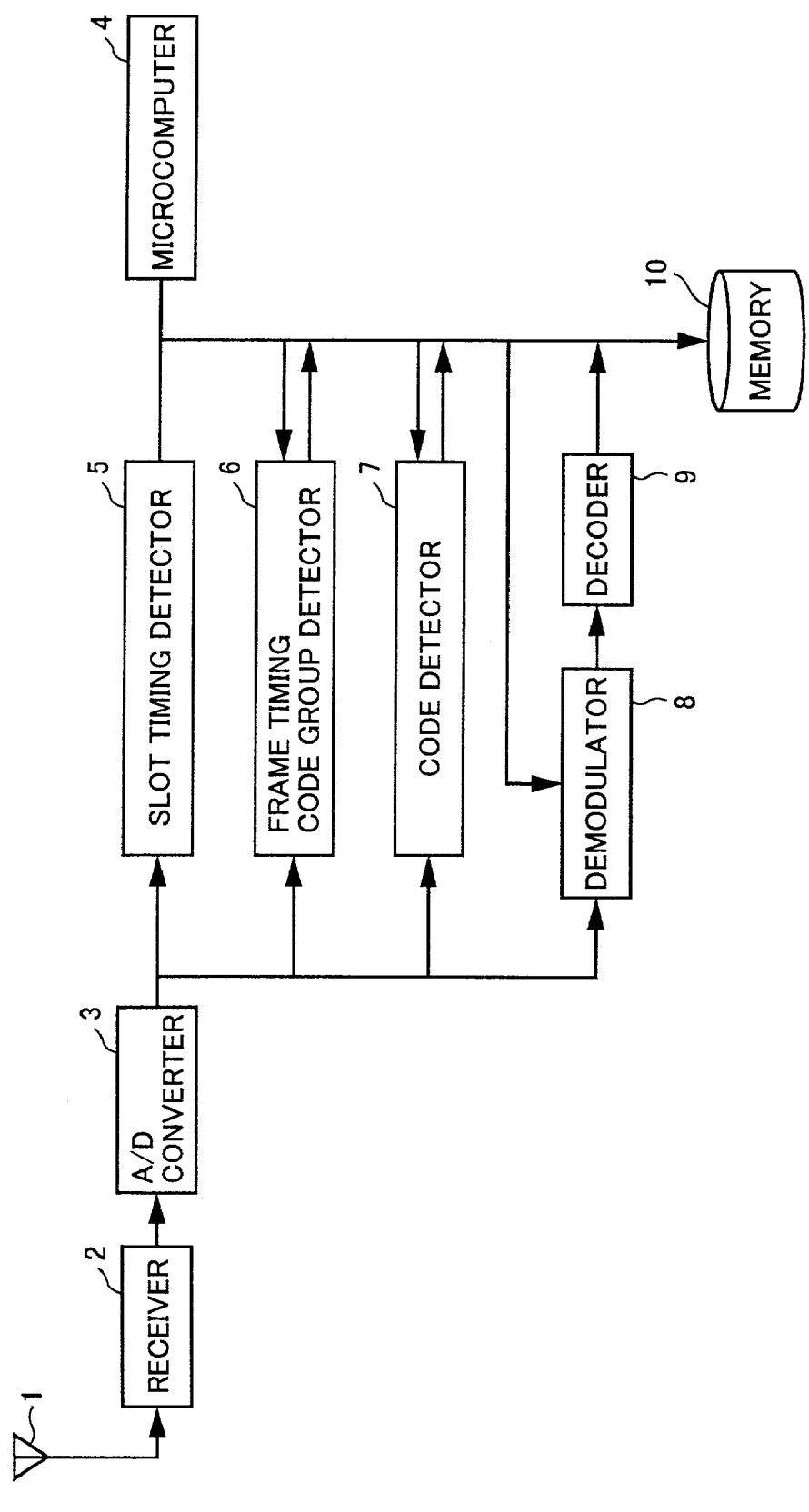
FIG. 1 is a block diagram showing a schematic structure of a mobile communication terminal of a first embodiment of the invention.

FIG. 1 is a block diagram showing a schematic structure of a mobile communication terminal of a first embodiment of the invention. This mobile communication terminal includes an antenna 1, a receiver 2 which receives a weak radio frequency wave sent from base stations via antenna 1 and down-converts that into a baseband frequency wave, an A/D (Analog-to-Digital) converter 3 which converts received analog signals into digital signals, a microcomputer 4 which performs entire control of the mobile communication terminal, a slot timing detector 5 for detecting slot timing during cell search, a frame timing and code group detector 6 which detects frame timing and code group during cell search, a code detector 7 which detects a code during cell search, a demodulator 8 which demodulates a received code with a detected spread codes, a decoder 9 which decodes the received signals demodulated by demodulator 8, and a memory 10 which stores a program to be executed by microcomputer 4 and others. The detection of the frame timing may be performed by code detector 7.

Figure 2:
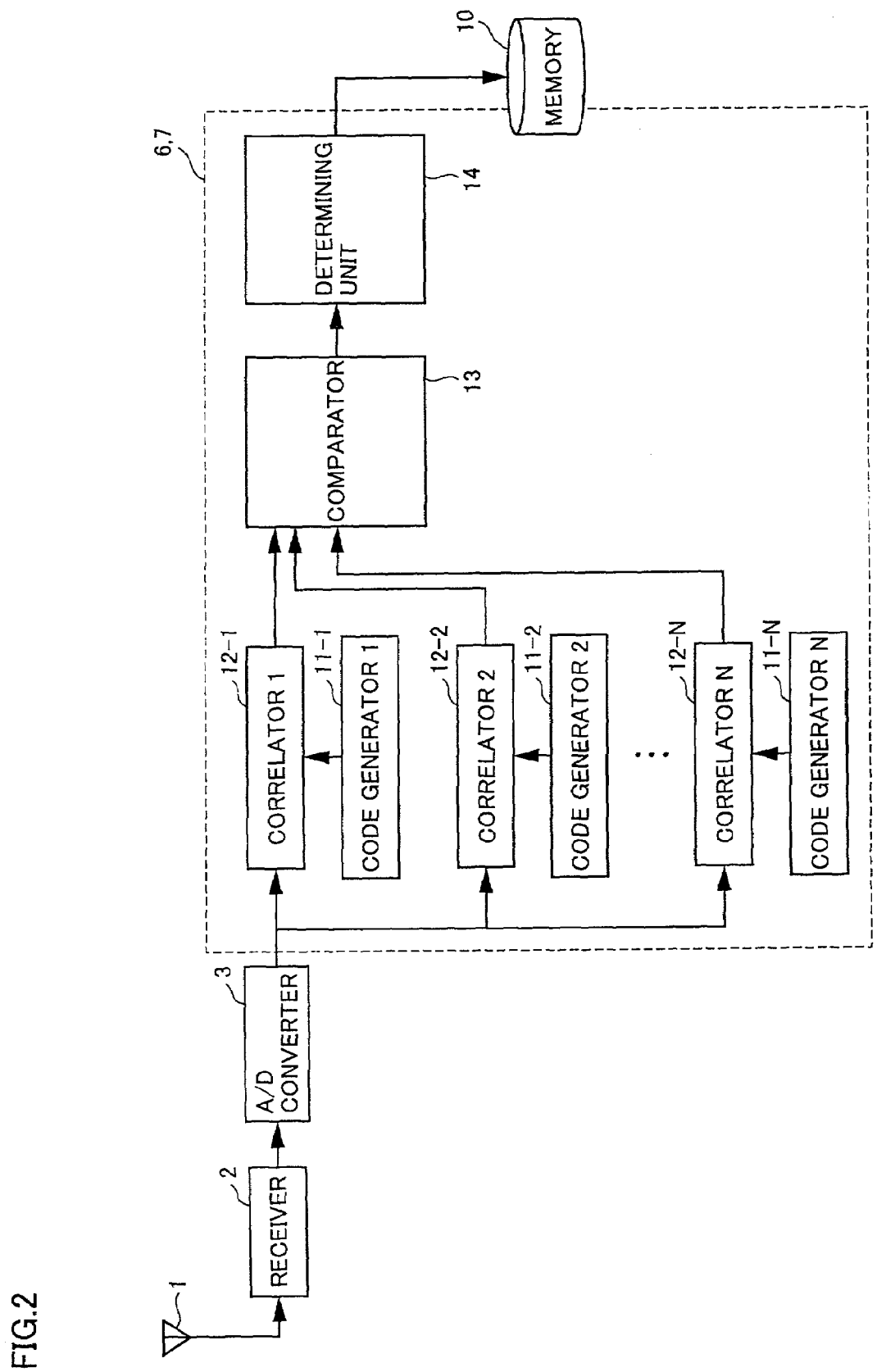
FIG. 2 is a block diagram showing schematic structures of a frame timing and code group detector 6 and a code detector 7 of the mobile communication terminal of the first embodiment of the invention.

FIG. 2 is a block diagram showing a schematic structure of frame timing and code group detector 6. Frame timing and code group detector 6 includes code generators 1–N (11-1–11-N) generating codes, which are used when detecting a code group, correlators 1–N (12-1–12-N) which calculates correlations between a digital signal sent from A/D converter 3 and the codes generated by code generators 1–N (11-1–11-N), a comparator 13 comparing correlation values output from correlators 1–N (12-1–12-N), and a determining unit 14 which determines a code group exhibiting a high correlation based on the result of comparison by comparator 13. The result of determination of determining unit 14 is stored in memory 10.

Code detector 7 has a structure similar to that of frame timing and code group detector 6 shown in FIG. 2. However, code generators 1–N (11-1–11-N) do not generate the codes for detecting the code group, but generate the codes for detecting the codes so that correlators 1–N (12-1–12-N) calculate the correlations between the digital signal sent from A/D converter 3 and the codes output from code generators 1–N (11-1–11-N).

Figure 3:
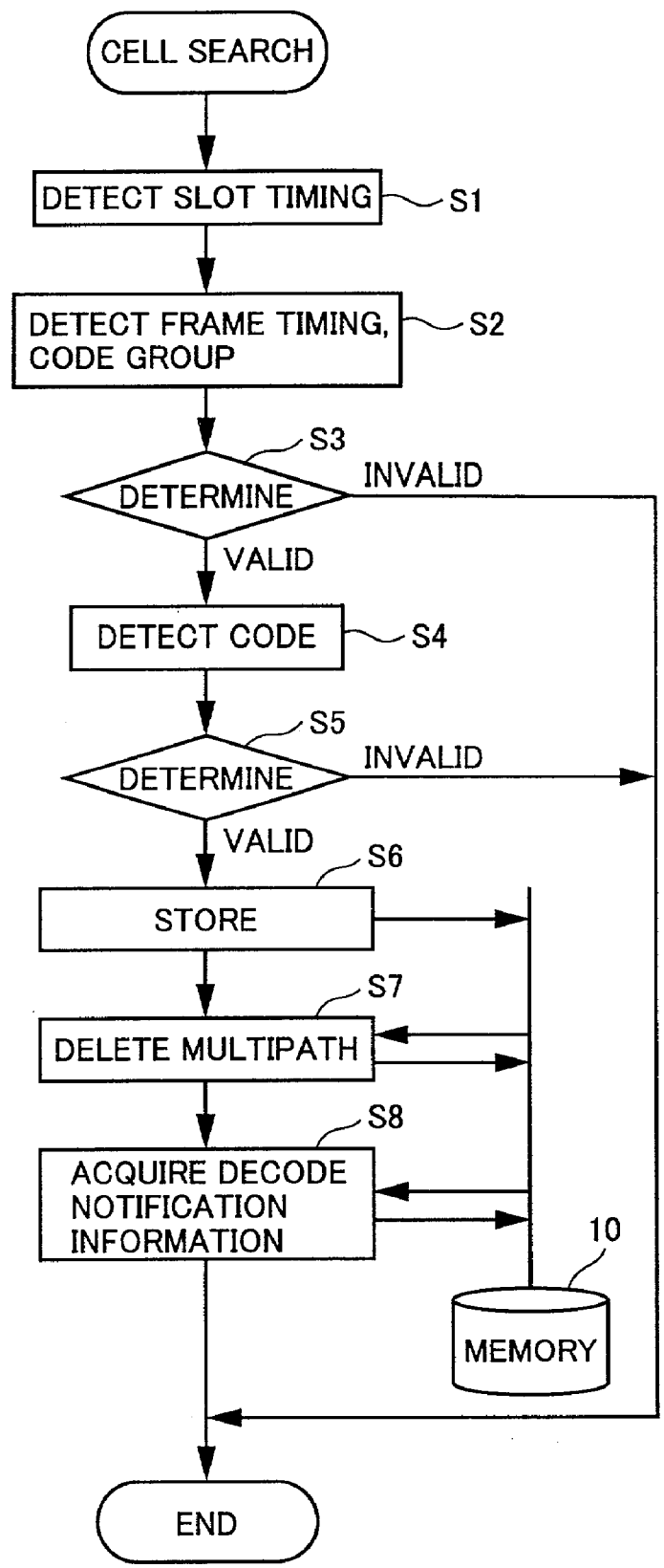
FIG. 3 is a flowchart for showing a processing procedure of the mobile communication terminal of the first embodiment of the invention.

FIG. 3 is a flowchart showing a processing procedure of the mobile communication terminal of the first embodiment of the invention. First, slot timing detector 5 receives the digital signal sent from A/D converter 3, and detects the slot timing (S1). Frame timing and code group detector 7 detects the frame timing from the digital signal sent from A/D converter 3 using the frame timing code, and detects the code group based on the slot timing detected by slot timing detector 5 (S2).

Then, microcomputer 4 determines whether the frame timing and code group detected by frame timing and code group detector 6 are valid or not (S3). For example, it is determined that the code group is invalid if there is no code group exhibiting a high correlation, as will be described later in connection with a second embodiment. If it is determined that the frame timing or code group is invalid (invalid in S3), microcomputer 4 ends the processing as it is. If it is determined that the frame timing and code group are valid (valid in S3), microcomputer 4 operates to detect the code by code detector 7 (S4).

Then, microcomputer 4 determines whether the code detected by code detector 7 is valid or not (S5). For example, it is determined that the code is invalid if the code exhibiting a high correlations is not present, as will be described later in connection with the second embodiment. When it is determined that the code is invalid (invalid in S4), microcomputer 4 stops the processing as it is. When it is determined that the code is valid (valid in S4), microcomputer 4 stores the code in memory 10. The multipath is detected and deleted from the code stored in memory 10 (S7). Decoder 9 decodes the data demodulated by demodulator 8 to acquire the notification information, and the processing ends.

According to the mobile communication terminal of this embodiment, as described above, the information is not stored, and the processing stops if the frame timing, code group or code is invalid. Therefore, the detection of the multipath during the cell search can be efficiently performed, and the processing speed can be improved.

Second Embodiment

A mobile communication terminal of a second embodiment of the invention differs from the mobile communication terminal of the first embodiment shown in FIG. 1 only in the structures of the frame timing and code group detector and the code detector as well as the program to be executed by microcomputer 4. Accordingly, description of the structures and functions similar to those of the first embodiment is not repeated. In the second embodiment, the frame timing and code group detector and the code detector bear the reference numbers 6' and 7', respectively.

Figure 4:
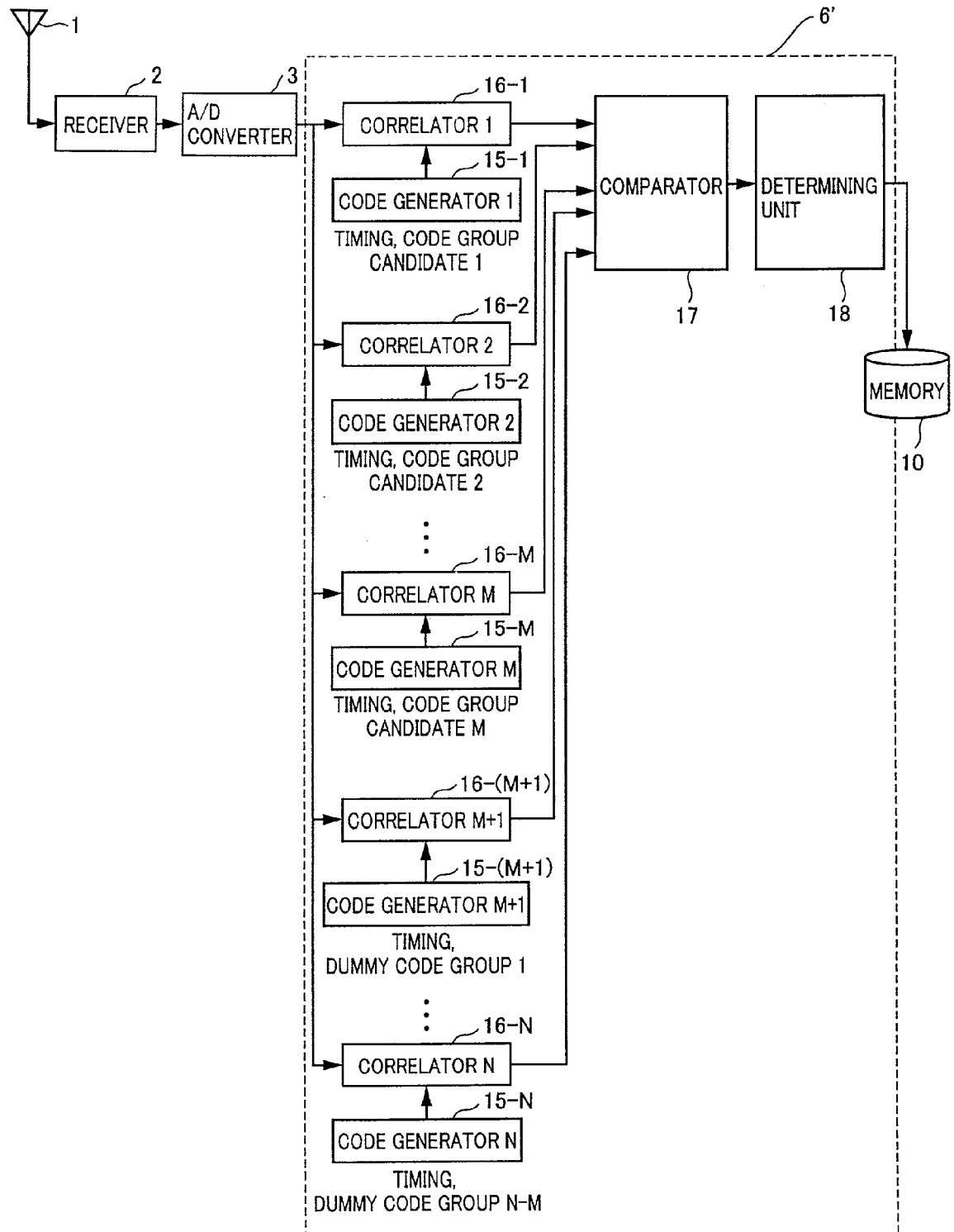
FIG. 4 is a block diagram showing a schematic structure of a frame timing and code group detector 6' of a mobile communication terminal of a second embodiment of the invention.

FIG. 4 is a block diagram showing a schematic structure of frame timing and code group detector 6' of the second embodiment. Frame timing and code group detector 6' includes code generators 1–M (15-1–15-M) generating codes for detecting the frame timing and the code group, code generators M+1–N (15-(M+1)–15-N) generating dummy codes, correlators 1–N (16-1–16-N) which calculate correlations between the digital signals sent from A/D converter 3 and the codes output from code generators 1–N (15-1–15-N), a comparator 17 which compares correlation values output from correlators 1–N (16-1–16-N), and a determining unit 18 which determines a code group exhibiting a high correlation based on the result of comparison by comparator 17.

Code generators 1–M (15-1–15-M) generate codes for detecting the original frame timing code and code group. Meanwhile code generators M+1–N (15-(M+1)–15-N) are employed for generating codes for detecting the frame timing code and dummy code group, and thus generate the dummy codes different from the codes generated by code generators 1–M (15-1–15-M).

If code generators M+1–N (15-(M+1)–15-N) generating the dummy code group were not employed, determination would be performed to identify the one among code generators 1–M (15-1–15-M), which generated the frame timing code and the code group exhibiting the highest correlation with respect to the digital signal sent from A/D converter 3, and thereby the code group would be detected. In this case, however, even if the digital signal sent from A/D converter 3 exhibited a low correlation with respect to each of the code groups generated by code generators 1–M (15-1–15-M), one of them would be detected as the code group, and this detection would be error in many cases.

In contrast to the above, code generators M+1–N (15-(M+1)–15-N) generate the frame timing codes and the dummy codes, and calculation is performed to determine the correlation of the received code with respect to the frame timing codes and the dummy code group generated by code generators M+1–N (15-(M+1)–15-N). When the result exhibits the highest correlation, it is determined that any code group is not detected so that erroneous detection of the code group is prevented.

Figure 5:
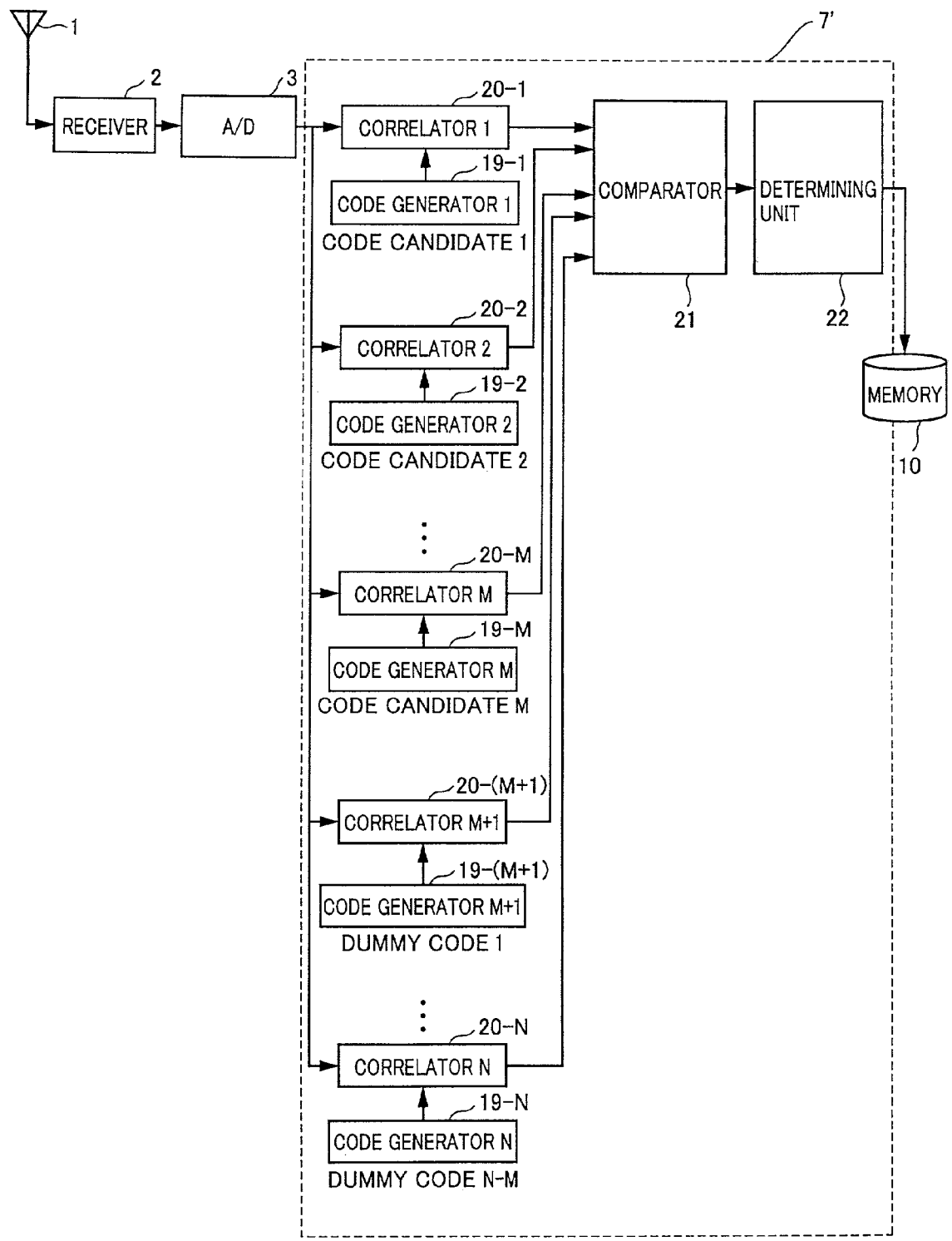
FIG. 5 is a block diagram showing a schematic structure of a code detector 7' of the mobile communication terminal of the second embodiment of the invention.

FIG. 5 is a block diagram showing a schematic structure of code detector 7'. Code detector 7' includes code generators 1–N (19-1–19-M) which generate codes for detecting the codes, code generators M+1–N (19-(M+1)–19-N) which generates dummy codes, correlators 1–N (20-1–20-N) which calculate the correlations between the digital signal sent from A/D converter 3 and the codes output from code generators 1–N (19-1–19-N), a comparator 21 which compares the correlation values output from correlators 1–N (20-1–20-N), and a determining unit 22 which determines a code exhibiting a high correlation based on the result of comparison by comparator 21.

Code generators 1–M (19-1–19-M) generate the codes for detecting original codes. Meanwhile, code generators M+1–N (19-(M+1)–19-N) are employed for generating the codes for detecting the dummy code, and are configured to generate the dummy codes, which are different from the codes generated by code generators 1–M (19-1–19-M).

If code generators M+1–N (19-(M+1)–19-N) generating the dummy codes were not employed, determination would be performed to identify the one among code generators 1–M (19-1–19-M), which generated the code exhibiting the highest correlation with respect to the digital signal sent from A/D converter 3, and thereby the code is detected. In this case, however, even if the digital signal sent from A/D converter 3 exhibited a low correlation with respect to each of the codes generated by code generators 1–M (19-1–19-M), one of them would be detected as the code, and this detection would be error in many cases.

In contrast to the above, code generators M+1–N (19-1–19-N) generate the frame timing codes and the codes. In the case where the highest correlation is present between the dummy code generated by code generators M+1–N (19-(M+1)–19-N) and the received code, it is determined that the code is not received so that erroneous detection of the code is prevented.

According to the mobile communication terminal of this embodiment, as described above, the code generators generate the dummy code group or dummy codes, and detection of the code group or code is not performed if the received code exhibits a high correlation with respect to the dummy code group or the dummy code. Therefore, erroneous detection of the code group or code can be prevented.

Third Embodiment

A mobile communication terminal of a third embodiment of the invention differs from the mobile communication terminal of the first embodiment shown in FIG. 1 only in the program to be executed by microcomputer 4. Accordingly, description of the structures and functions similar to those of the first embodiment is not repeated.

Figure 6:
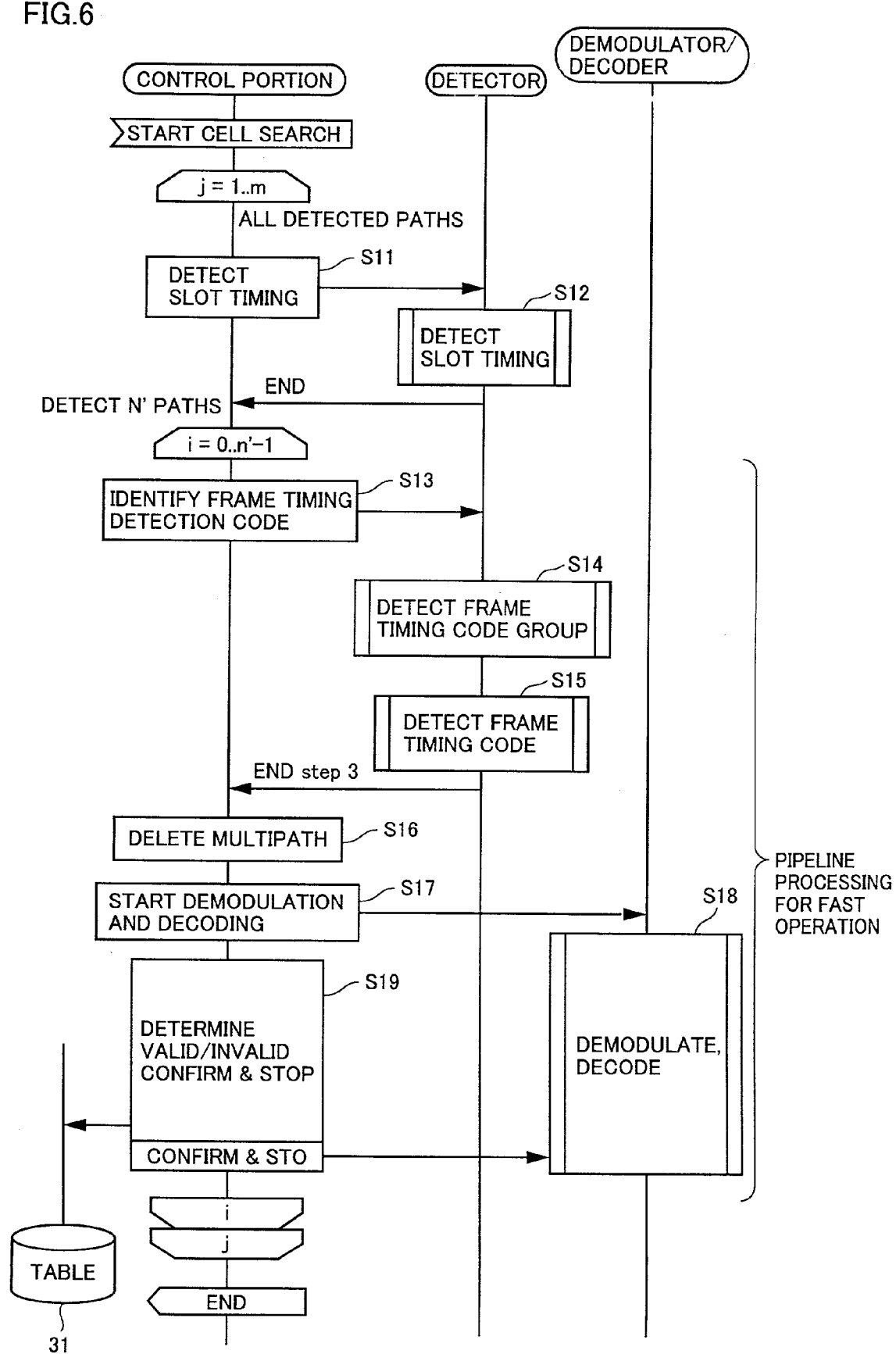
FIG. 6 is a flowchart showing a processing procedure of a mobile communication terminal of a third embodiment of the invention.

FIG. 6 is a flowchart showing a processing procedure of the mobile communication terminal of the third embodiment. In this flowchart, m indicates a number of operations of searching the slot, and n' indicates the number of paths detected in a step S12. For example, if one slot is searched by four divided operations, m is equal to 4, and n' represents the number of paths detected in this processing.

When microcomputer 4 instructs slot timing detector 5 to detect the slot timing (S11), slot timing detector 5 detects the search code of the slot, and thereby detects the slot timing applied from each base station (S12). The number of paths detected in this processing is represented by n' as described above.

Then, microcomputer 4 instructs detection of the frame timing and identification of the spread codes to frame timing and code group detector 6 and code detector 7 (S13). When frame timing and code group detector 6 receives the instruction for identification of the spread codes, calculation is performed to determine the correlation between the received data in a search range j of the slot and the code groups generated by code generators 1–N, and thereby the code group is detected (S14). When code detector 7 receives the instruction for identification of the spread codes, the calculation is performed to determine the correlation between the received data in the search range j of the slot and the code groups generated by code generators 1–N, and thereby the code is detected (S15).

Microcomputer 4 discriminates between the multipath and the paths sent from different base stations based on the spread codes, which is identified by frame timing and code group detector 6 and code detector 7, and deletes the multipath if is detected (S16).

Figure 7:
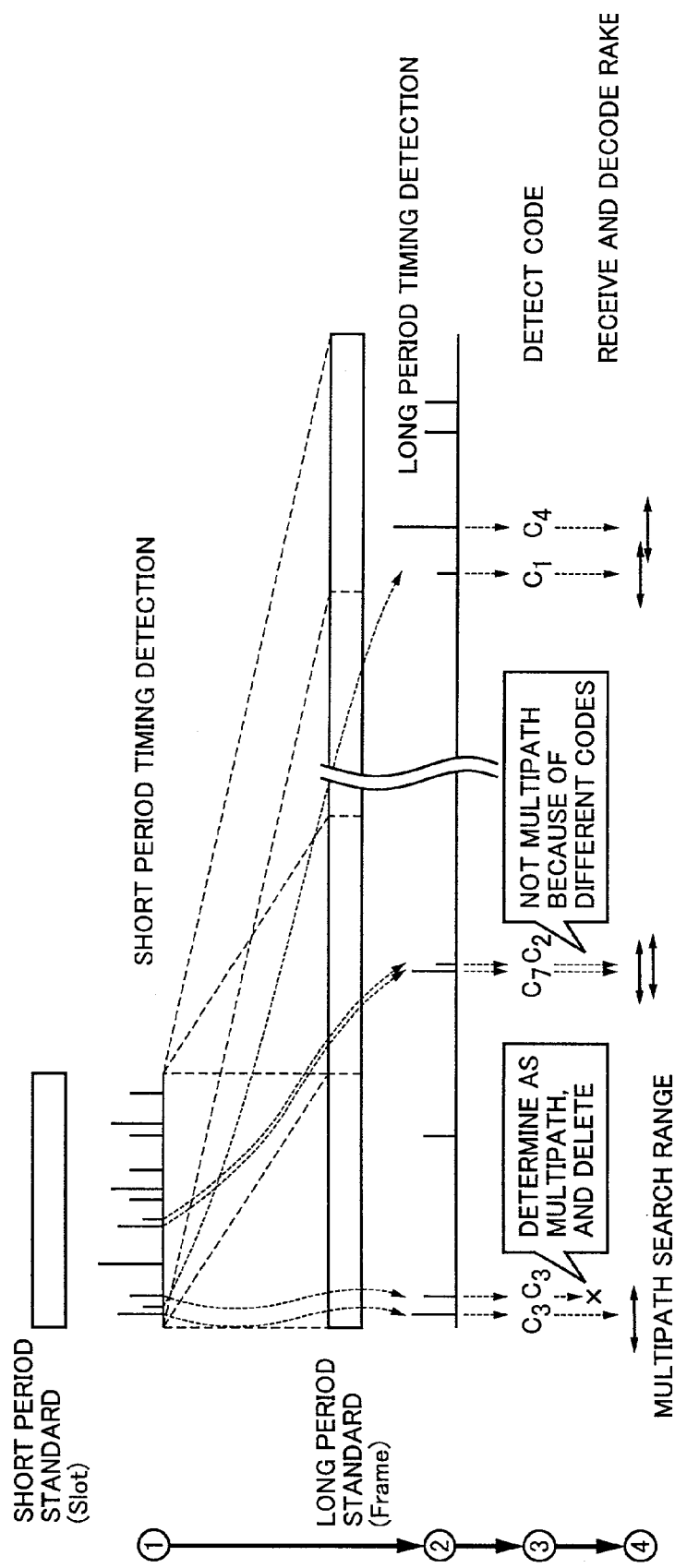
FIG. 7 shows determination of a multipath component.
Figure 8:
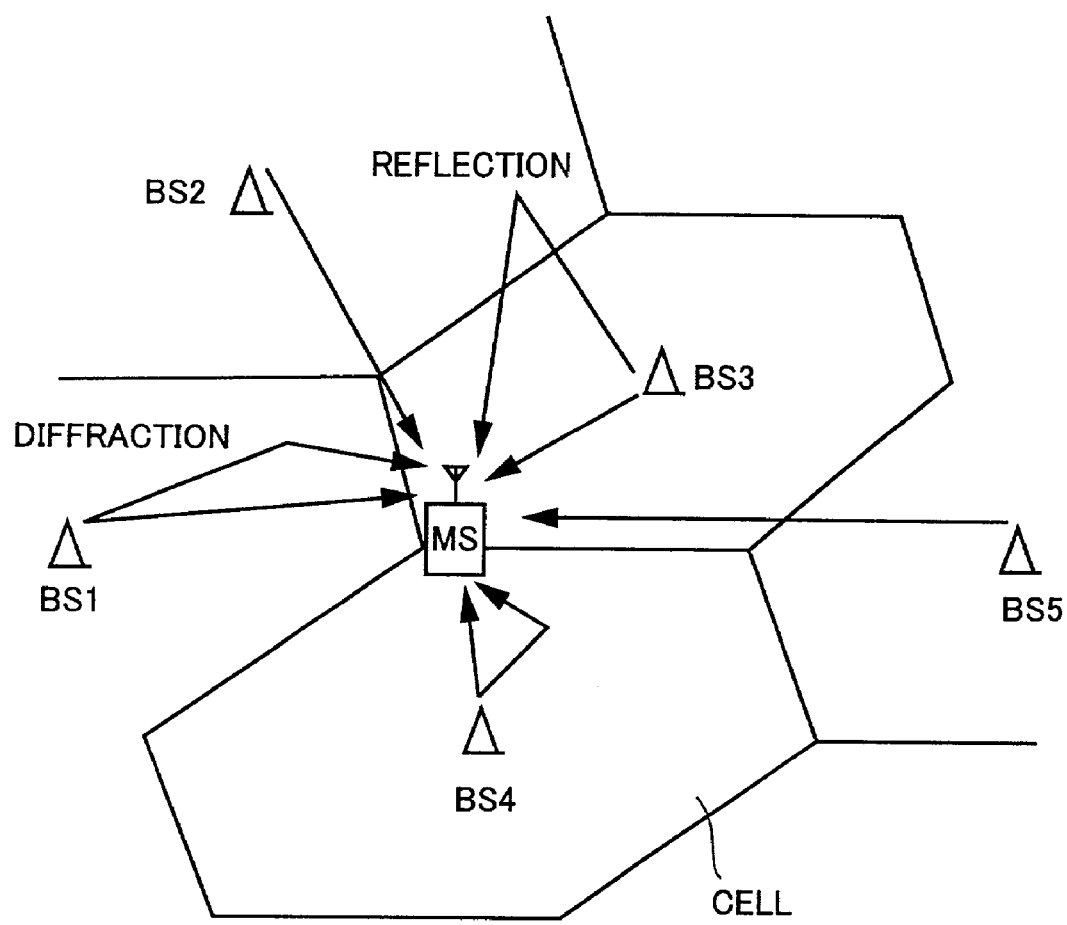
FIG. 8 shows that MS receives radio waves which include multipath components from adjacent cells.
Figure 9:
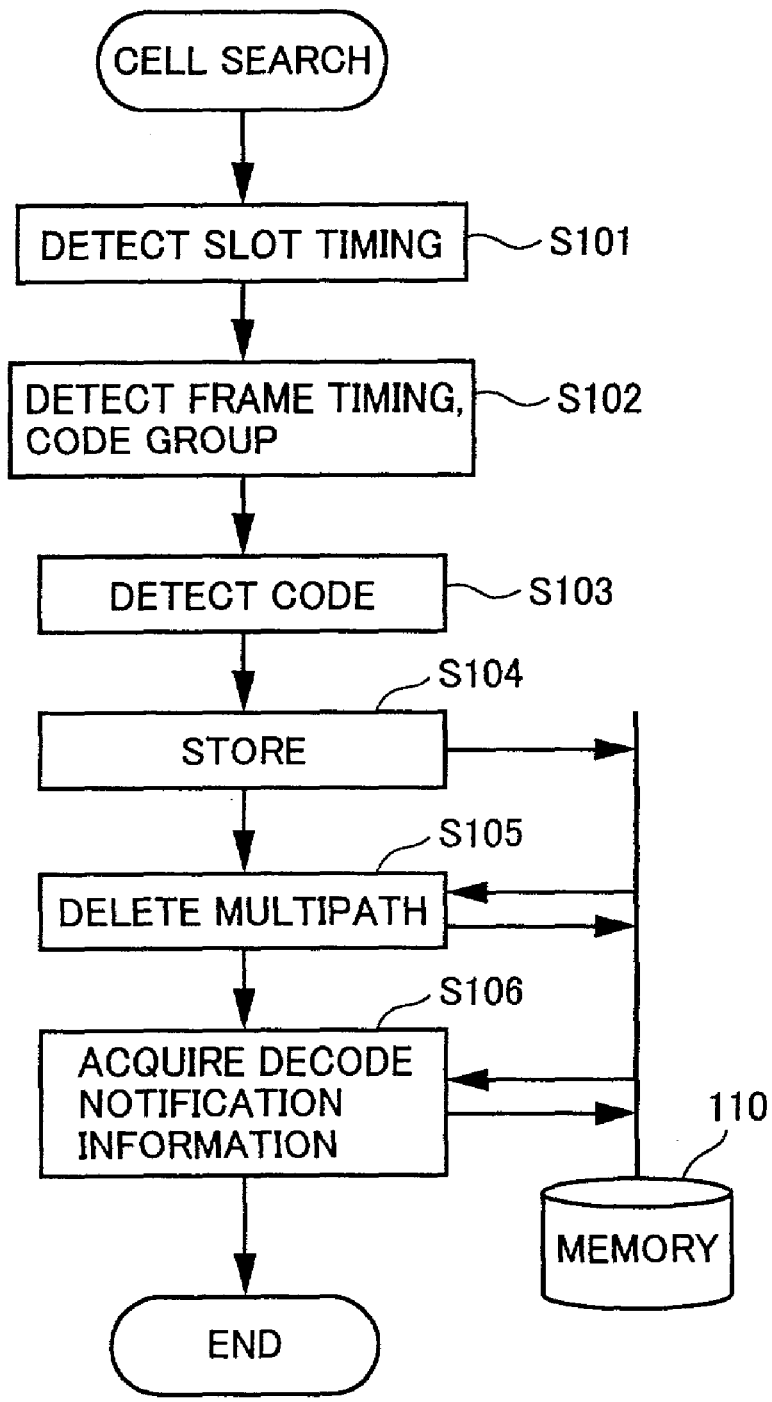
FIG. 9 is a flowchart showing recognition and deletion of the multipath component during cell search in the prior art.

FIG. 7 shows detection of the multipath. When the slot indicated by shown in FIG. 7 is received, slot timing of each of slots, which are multiplexed in one slot, is detected (S12 in FIG. 6). As indicated by in FIG. 7, the frame timing and code group are detected (S14 in FIG. 6). As indicated by in FIG. 7, the code is detected (S15 in FIG. 6). The frame timing, code group and code are successively detected by performing the search m times (m: time of search operations).

As indicated by in FIG. 7, when the spread codes is identified, it is determined for the paths detected in the same slot whether the multipath is present or not based on whether the same spread codes are detected for a time period not exceeding a predetermined time (S16 in FIG. 6). For example, in the slot at the left end, two paths are detected within the predetermined time, and both exhibit the spread codes of "$C_3$" so that the latter path is determined as the multipath, and is deleted. Two paths detected in the second left slot are detected within the predetermined time, but exhibit different spread codes "C₇" and "C₂" so that these are determined as carrier waves coming from different base stations, respectively. Further, two paths in the slot at the right end are not detected within the predetermined time, and therefore are determined that these are not multipath.

Again, the flowchart of FIG. 6 will be described. Microcomputer 4 then instructs demodulator 8 and decoder 9 to start demodulation and decoding of the received data (S17). Demodulator 8 and decoder 9 start the demodulation and decoding in accordance with the instructions sent from microcomputer 4 (S18). In this processing, the multipath is already deleted so that the times required for demodulation and decoding can be short.

Microcomputer 4 performs the processing of determining validity/invalidity of the received data in parallel with the processing by demodulator 8 and decoder 9 (S19). If the received data is valid, the received data is stored in a table 31. If invalid, microcomputer 4 instructs demodulator 8 and decoder 9 to stop the processing. Since processing by microcomputer 4 in steps S13, S16, S17 and S19, the processing by frame timing and code group detector 6 and code detector 7 in steps S14 and S15, and the processing by demodulator 8 and decoder 9 in step S18 can be performed in parallel with each other so that these can be performed as pipeline processing, whereby the cell search can be performed further fast.

The processing in steps S13–S19 described above are performed for i=0–n'-1, and the processing is effected on the detected paths of n' in number. When the processing on the detected paths of n' in number is completed, the processing returns to step S11, and processing for the next search ranges is successively performed.

According to the mobile communication terminal of the embodiment, as described above, one slot is divided into a plurality of search ranges, and identification of the spread codes, deletion of the multipath, and demodulation and decoding of the received data are successively performed in the search ranges thus divided. Therefore, the time required for decoding the multipath can be reduced so that the cell search can be performed fast. Further, it is not necessary to employ a memory of a large capacity, which is required in the prior art for storing information used for deleting the multipath. Accordingly, the scale of hardware of the mobile communication terminal can be reduced.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A mobile communication terminal, comprising:
    a receiver receiving radio signals from base stations;
    a detector detecting spread codes from said signals received by said receiver, said detector including:
        a slot timing detector detecting slot timing from the signals received by said receiver,
        a frame timing and code group detector detecting frame timing and a code group based on the slot timing detected by said slot timing detector from the signals received by said receiver, and
        a code detector detecting a code based on the slot timing detected by said slot timing detector and the code group detected by said frame timing and code group detector from the signals received by said receiver;
    a demodulator demodulating the received signals with the spread codes detected by said detector;
    a decoder decoding data demodulated by said demodulator; and
    a control unit controlling a cell search process, and stopping signal processing of the cell search in response to detection of an invalid frame timing, code group or code based on information received from the base station.

2. The mobile communication terminal according to claim 1, wherein said control unit stops the processing of received signals when the code group detected by said frame timing and code group detector is not a predetermined code.

3. The mobile communication terminal according to claim 2, wherein said frame timing and code group detector includes:
    a plurality of code generators, each of said code generators generating a code corresponding to a different code group,
    a plurality of dummy code generators generating dummy codes different from the code groups generated by said plurality of code generators,
    a plurality of correlators calculating correlations between the signal received by said receiver and the codes and dummy codes generated by the plurality of code generators and the plurality of dummy code generators, respectively, and
    a determining unit determining invalidity of the detected slot timing based on the calculation result of said plurality of correlators.

4. The mobile communication terminal according to claim 1, wherein said control unit stops the signal processing of the cell search if the code detector detects a code group other than a code group including the predetermined code.

5. The mobile communication terminal according to claim 4, wherein said code detector includes:
    a plurality of code generators, each of said code generators generating a different code,
    a plurality of dummy code generators generating dummy codes different from the codes generated by said plurality of code generators,
    a plurality of correlators calculating correlations between the signal received by said receiver and the codes and dummy codes generated by the plurality of code generators and the plurality of dummy code generators, respectively, and
    a determining unit determining invalidity of the detected slot timing based on the calculation result of said plurality of correlators.

6. A communication method, comprising:
    receiving radio signals from base stations;
    detecting spread codes from said received signals, including:
        detecting slot timing from said received signals,
        detecting a code group based on said detected slot timing from said received signals, and
        detecting a code based on said detected slot timing and said detected code group;
    demodulating the received signals with said detected spread codes;
    decoding said demodulated data;
    controlling a cell search process;
    stopping the signal processing of the cell search if the frame timing, code group or code is invalid;
    stopping the signal processing of the cell search if the code group received from the base station is not a code group including a predetermined code, and wherein said stopping the signal processing of the cell search includes:
- generating codes corresponding to a plurality of different code groups,
- generating dummy codes different from said codes,
- calculating correlations of said received signals with respect to said generated codes and dummy codes, and
- determining invalidity of the detected code group based on a result of said calculation.

7. The communication method according to claim 6, wherein said step of stopping the signal processing of the cell search includes the step of stopping the signal processing of the cell search if the code received from the base station is not a predetermined code.

8. The communication method according to claim 7, wherein said step of stopping the signal processing of the cell search includes the steps of:
- generating a plurality of different codes,
- generating a plurality of dummy codes different from said plurality of different codes,
- calculating correlations of said received signals with respect to said plurality of different codes and said plurality of dummy codes, and
- determining the invalidity of the detected slot timing based on a result of said calculation.

9. A communication method, comprising:
- at a receiver, receiving radio signals from base stations;
- detecting spread codes from the received signals, including:
  - detecting slot timing from the received signals,
  - detecting frame timing and a code group based on the detected slot timing, and
  - detecting a code based on the detected slot timing and the code group;
- demodulating the radio signals with the detected spread codes;
- decoding the demodulated data; and
- controlling a cell search process, and stopping signal processing of the cell search in response to detection of an invalid frame timing, code group or code based on information received from a base station.

10. The communication method according to claim 9, wherein the processing of received signals stops when the detected code group is not a predetermined code.

11. The communication method according to claim 10, further comprising, at a frame timing and code group detector:
- generating a plurality of codes corresponding to different code groups;
- generating a plurality of dummy codes different from the plurality of codes;
- calculating correlations between the received signals and the plurality of codes and the plurality of dummy codes; and
- determining invalidity of the detected slot timing based on the calculation result.

12. The communication method according to claim 9, wherein the signal processing of the cell search stops if a code group other than a code group including the predetermined code is detected.

13. The communication method according to claim 12, further comprising, at a code detector:
- generating a plurality of different codes,
- generating a plurality of dummy codes different from the plurality of different codes,
- calculating correlations between the received signals and the plurality of codes and the plurality of dummy codes; and
- determining invalidity of the detected slot timing based on the calculation result.

* * * * *